(12) United States Patent
Keller

(10) Patent No.: US 10,430,219 B2
(45) Date of Patent: Oct. 1, 2019

(54) CONFIGURING VIRTUAL MACHINES IN A CLOUD COMPUTING PLATFORM

(71) Applicant: YOKOGAWA ELECTRIC CORPORATION, Musashino-shi, Tokyo (JP)

(72) Inventor: Andrew Keller, Lewisville, TX (US)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 607 days.

(21) Appl. No.: 14/297,960

(22) Filed: Jun. 6, 2014

(65) Prior Publication Data

US 2015/0355923 A1    Dec. 10, 2015

(51) Int. Cl.
*G06F 9/44* (2018.01)
*G06F 9/455* (2018.01)

(52) U.S. Cl.
CPC ............... *G06F 9/45558* (2013.01); *G06F 2009/45575* (2013.01)

(58) Field of Classification Search
CPC .................................................. G06F 9/45533
USPC .............................................................. 718/1
See application file for complete search history.

(56) References Cited

U.S. PATENT DOCUMENTS

| | | | | |
|---|---|---|---|---|
| 8,346,921 B1 * | 1/2013 | Goodspeed | ............ | G06Q 30/02 709/200 |
| 9,769,085 B2 * | 9/2017 | Laribi | ................. | H04L 12/6418 |
| 9,781,205 B2 * | 10/2017 | Batrouni | ............. | H04L 67/1097 |
| 2003/0055676 A1 * | 3/2003 | Huneycutt | ............. | G06Q 50/06 705/412 |
| 2004/0044643 A1 * | 3/2004 | deVries | ............... | G06F 9/45558 |
| 2008/0244579 A1 † | 10/2008 | Muller | | |
| 2009/0106571 A1 * | 4/2009 | Low | ...................... | G06F 9/4856 713/310 |
| 2010/0088150 A1 * | 4/2010 | Mazhar | ................. | G06F 9/5088 717/120 |
| 2010/0115049 A1 * | 5/2010 | Matsunaga | ........... | G06F 3/0626 709/216 |
| 2011/0231899 A1 * | 9/2011 | Pulier | ................. | G06F 9/45558 726/1 |
| 2012/0011509 A1 * | 1/2012 | Husain | .................. | G06F 9/5088 718/1 |

(Continued)

OTHER PUBLICATIONS

Microsoft Azure, The cloud for modern business; http://azure.microsoft.com/en-us/.

(Continued)

*Primary Examiner* — Andy Ho
(74) *Attorney, Agent, or Firm* — Sughrue Mion, PLLC

(57) ABSTRACT

There is provided a virtual machine control with the ability to configure a virtual machine's behavior when certain conditions are met. The conditions include configuring a virtual machine based on an amount of time of inactivity. The conditions include configuring a virtual machine based on exceeding a cost for a given time frame. The virtual machine control removes the need to have a user manually monitor and shut down unused virtual machines. Accordingly, the virtual machine is automatically commanded to shut down if it exceeds a threshold operational cost or is inactive beyond a threshold amount of time. The virtual machine control also provides a calculation of the projected cost of running a virtual machine.

12 Claims, 4 Drawing Sheets

(56) References Cited

U.S. PATENT DOCUMENTS

| | | | |
|---|---|---|---|
| 2013/0235416 A1* | 9/2013 | Moore | G06F 3/1211 358/1.15 |
| 2013/0297802 A1* | 11/2013 | Laribi | H04L 47/80 709/226 |
| 2014/0026133 A1* | 1/2014 | Parker | G06F 9/5083 718/1 |
| 2014/0181816 A1† | 6/2014 | Muller et al. | |
| 2015/0130813 A1† | 5/2015 | Taraki et al. | |
| 2015/0331702 A1† | 11/2015 | Bragstad et al. | |
| 2016/0139949 A1* | 5/2016 | Jagannath | G06F 9/5022 718/1 |
| 2016/0191343 A1* | 6/2016 | Dong | G06F 9/5083 709/226 |
| 2017/0132042 A1* | 5/2017 | Cherkasova | G06F 9/5061 |

OTHER PUBLICATIONS

Microsoft Azure, Virtual Machines Pricing Details; http://azure.microsoft.com/en-us/pricing/details/virtual-machines/.

\* cited by examiner
† cited by third party

Prior Art

CONFIGURING VIRTUAL MACHINES IN A CLOUD COMPUTING PLATFORM

BACKGROUND

Field

Exemplary embodiments relate to a control system, virtual machine control software, user interfaces, methods for control of multiple devices, a device network for controlling a device in a cloud environment, and industrial automation processes.

Background

In the related art, a user can manually select a virtual machine for shut down. Shutting down a virtual machine can be useful for energy savings and saving compute time costs when a virtual machine will be inactive for period of time.

In the related art, virtual machines (VM) in a cloud environment will run until they are manually shut down. One example in the related art is the usage of a cloud computing platform, such as [WINDOWS] [AZURE], to individually select and shut down a virtual machine. In the cloud computing platform [WINDOWS] [AZURE], the method to shut down a running virtual machine first requires logging into the [AZURE] Control Panel. Once the user is logged into the [AZURE] Control Panel, the user must then bring up the list of all virtual machines running. Then, the user must manually select a virtual machine and then click a button to shut down the virtual machine. This process of manual selection must be repeated for each virtual machine the user wishes to shut down.

As an alternative to the repeated process of manual selection for virtual machine shut downs, the user may also initiate a shut down command from code using the [AZURE] REST API if the user knows the name of a specific virtual machine. Accordingly, if a user knows the virtual machine's name, it is also possible to shut down a virtual machine through code. FIG. 1A shows the two options for the user to implement shut down of a virtual machine 11 in a cloud 12. The user may either user the Control Panel 13 or code using the REST API 14 to command a shut down of the specified virtual machine. Both methods do require the user choose a virtual machine and initiate shut down, whether by manual selection or by code. FIG. 1B shows a conventional architecture for a processor based system 100 having a processor 101, storage memory 102, I/O device 103, VM bus 104, and the like.

Separately, with the current tools of [WINDOWS] [AZURE], there is no way to get a cost estimate for all the virtual machines that are running. In order to get the current cost of a virtual machine, a manual calculation must be performed by the user. First, the size of the virtual machine must be determined by logging into the [AZURE] portal. Then, the user must look up the price per hour in an [AZURE] virtual machine cost chart. This price must be then multiplied by the total hours that the virtual machine has been running. This method of calculation requires significant user input and the calculation can be inaccurate unless the user has tracked the exact run time of a virtual machine.

SUMMARY

According to one or more embodiments of the disclosure, a virtual machine shut down method provides for an automatic shut down process based upon operating conditions. The automated shut down of a virtual machine can provide cost savings and energy savings for the user. Additionally, by providing for automated shut down, the user can save the time required to manually monitor the virtual machines running in the cloud. Efficiency can be improved, at least because the costly and time consuming requirement for the user to manually monitor virtual machines running in the cloud is eliminated. The ability to configure an automatic process provides for a more efficient way to ensure the virtual machines are operating cost effectively.

In one or more embodiments of the disclosure, a virtual machine control method includes the ability to configure an action for a virtual machine when certain conditions are met. Such conditions can include configuring a virtual machine based on an amount of time of inactivity. In another embodiment, the conditions can include configuring a virtual machine based on the cost of running the virtual machine for a given time frame. The disclosed control methods remove the need to have a user manually monitor and shut down unused virtual machines.

In one embodiment, the virtual machine may be automatically commanded to shut down if it is inactive beyond a threshold amount of time.

In one or more embodiments, the control method provides a method of calculating the current cost of running a virtual machine. Further, the virtual machine may be automatically commanded to shut down if it exceeds a threshold cost for a given time frame of inactivity.

These embodiments are in contrast to the current [AZURE] cloud environment, where there is no method to automatically shut down a running virtual machine that is not being used.

In another embodiment, the control method provides a method of calculating the projected future costs of a virtual machine or a group of virtual machines for a given timespan. This will give the user the ability to be able to forecast the cost of running a virtual machine in the cloud rather than requiring a manual calculation. In the related art, there are no tools to show the cost of running a virtual machine deployed to a cloud or to project future costs. Currently cost calculation has to be done manually by going to a web site and getting the costs for the different features used. These costs then have to be multiplied by an estimation of time the virtual machine has been running or will have been running. Such estimates are difficult since, typically, the cost data is only available on a monthly basis after the costs have been incurred.

In a further embodiment, the control method sends an alert or notification to the user when a threshold for a condition is met. The control method may prompt the user to decide on a course of action regarding the virtual machine. The user may then choose whether to command a shut down or other course of action.

Another embodiment of the disclosure provides for a method for controlling a device in a cloud environment, with a worker role, based on operating conditions, the method including storing configuration data input for a threshold value of an operating characteristic, receiving data regarding a status of the device, storing the data regarding the status of the device, and comparing the data with the threshold value of the operating characteristic. The device of such method may be a virtual machine. Further, the worker role acts if the data meets or exceeds the threshold value of the operating characteristic.

The method further includes deciding if an action is needed based on whether the data meets or exceeds the threshold value of the operating characteristic. The method further may include sending a command to shut down the virtual machine when the data meets or exceeds the threshold value of the operating characteristic. The method also may include sending an alert to notify a user that the data meets or exceeds the threshold value of the operating characteristic. And, the method may include sending an alert to notify a user that the data meets or exceeds the threshold value of the operating characteristic and asking for an instruction to shut down the virtual machine.

In one embodiment, the method further includes storing the data regarding a status of a virtual machine in an SQL database.

Such method may further include an input of configuration data by means of a website or mobile device.

In a further embodiment, the method includes using a threshold value of the operating characteristic that is a maximum inactivity time for the virtual machine, and wherein the data regarding the status of the virtual machine includes a length of inactivity time of the virtual machine.

Alternatively or in addition, the method further includes using a threshold value of the operating characteristic that is a maximum cost that the virtual machine can incur, and wherein the data regarding the status of a virtual machine includes a current cost of operation.

According to a further embodiment, there is a device network for controlling a device in a cloud environment, with a worker role, based on operating conditions, the device network including a cloud environment having the worker role, a device controllable by the cloud environment, a storage device, and an input device, wherein the worker role compares a data received from the device controllable by the cloud environment and a threshold value of an operating characteristic as configured though the input device.

Such device network may further include a device that is a virtual machine. Also, the worker role may decide if an action is needed based on whether the data meets or exceeds the threshold value of the operating characteristic.

The device network may make the threshold value of the operating characteristic a maximum inactivity time for the virtual machine, and wherein the data regarding the status of the virtual machine includes a length of inactivity time of the virtual machine.

Such device network may further include wherein the threshold value of the operating characteristic is a maximum cost that the virtual machine can incur, and wherein the data regarding the status of a virtual machine includes a current cost of operation.

DRAWINGS

The following is brief description of the drawings that are relevant to the disclosed invention.

FIG. 1B illustrates a conventional architecture for a processor based system having a processor, bus, I/O, storage and the like.

DETAILED DESCRIPTION

Figure 1A:
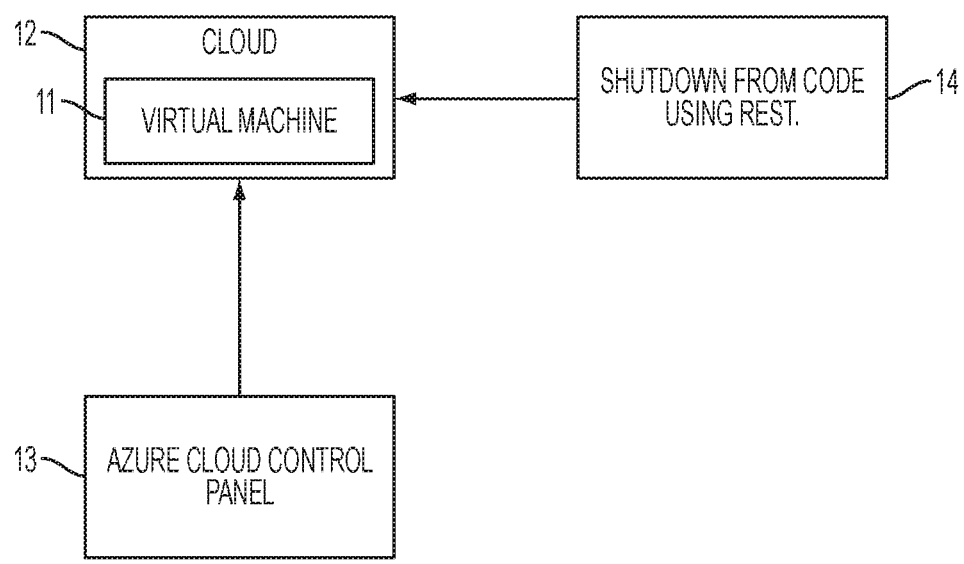
FIG. 1A illustrates the related art methods of manually or by code sending a shut down command to a virtual machine.
Figure 1B:
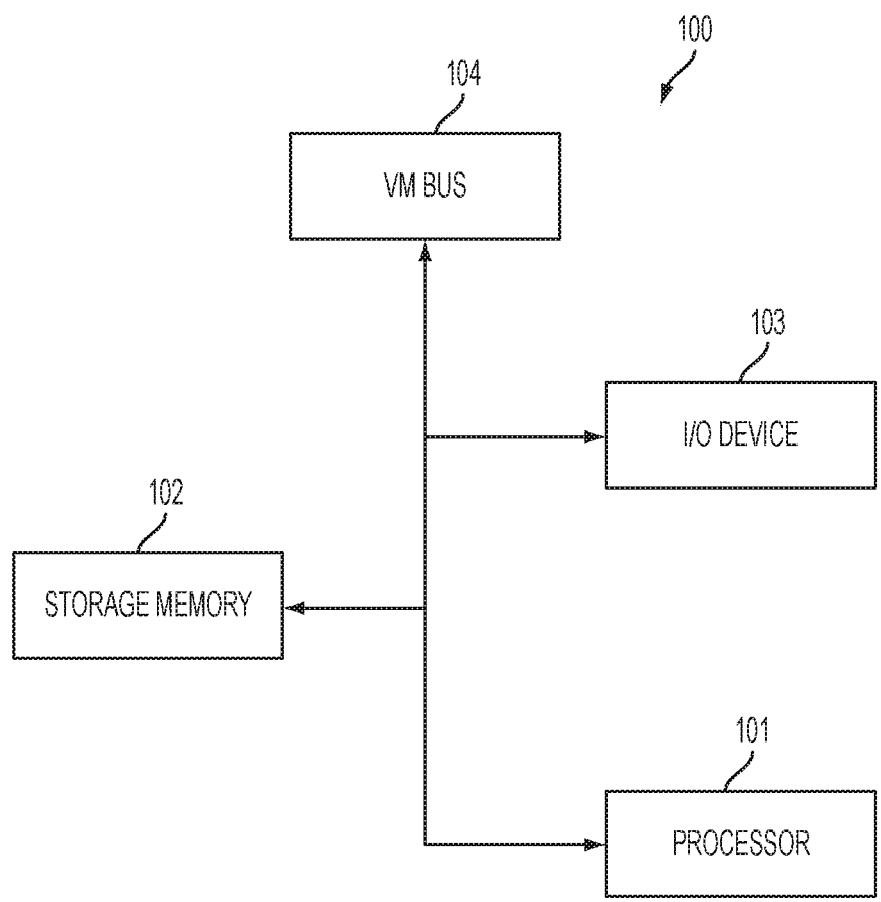

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

The non-limiting, exemplary use of "Structured Query Language" or "SQL" is merely to provide clarity for embodiments, and shall by no means be restrictive. The exemplary use is merely to aid in understanding of the application and does not preclude the use of alternative programming languages or database management systems.

The non-limiting, exemplary use of [WINDOWS] [AZURE] is merely to provide clarity for embodiments, and shall by no means be restrictive. The exemplary use is merely to aid in understanding of the application and does not preclude the use of alternative cloud computing platforms.

Configuration of a Virtual Machine Service

In one embodiment, a virtual machine control method includes the ability to configure a virtual machine's behavior when certain conditions are met. The virtual machine may have a service installed that can monitor the virtual machine's status and operating information. This service may interact with a worker role in a cloud platform that can monitor and keep track of the virtual machine information.

The service may send the virtual machine information to the cloud platform for the worker role to receive, process, and store the virtual machine information. The virtual machine information may include the virtual machine size, running state, inactivity timer, and length of the current runtime. The worker role may store the virtual machine information in a database, such as a SQL database. From the virtual machine information, cost calculations for the virtual machine may be performed.

Separately, through an input method, such as a user interface, webpage, or mobile device, a user can configure and store a threshold operating condition for the virtual machine, or configuration data, for when the user is interested in acting on the virtual machine.

The worker role can retrieve the configuration data and compare the virtual machine information to the configuration data.

Depending on the settings of the worker role and configuration data, the virtual machine can be automatically shut down through the worker role. Alternatively, the user may be sent an alert or notification regarding the virtual machine's status. Non-limiting examples of the notifications may include alerting the user as to a virtual machine exceeding an inactive runtime limit or exceeding a cost limit. The alert or notification may further provide the user with an option to shut down the virtual machine or continue to keep the virtual machine operating.

In one embodiment, the worker role can generate a cost report for a virtual machine or a group of virtual machines from the stored virtual machine information. The cost report may be formatted such that it can be displayed, such as on a user interface, webpage or mobile device.

According to a further embodiment, the future or projected costs may be calculated based on the virtual machine information. An alert or notification may be sent to the user to inform the user of an estimated time for exceeding a threshold for an operating condition. The alert or notification may further provide the user with an option to shut down the virtual machine or continue to keep the virtual machine operating when the threshold is met.

[WINDOWS] [AZURE] Embodiment

Figure 2:
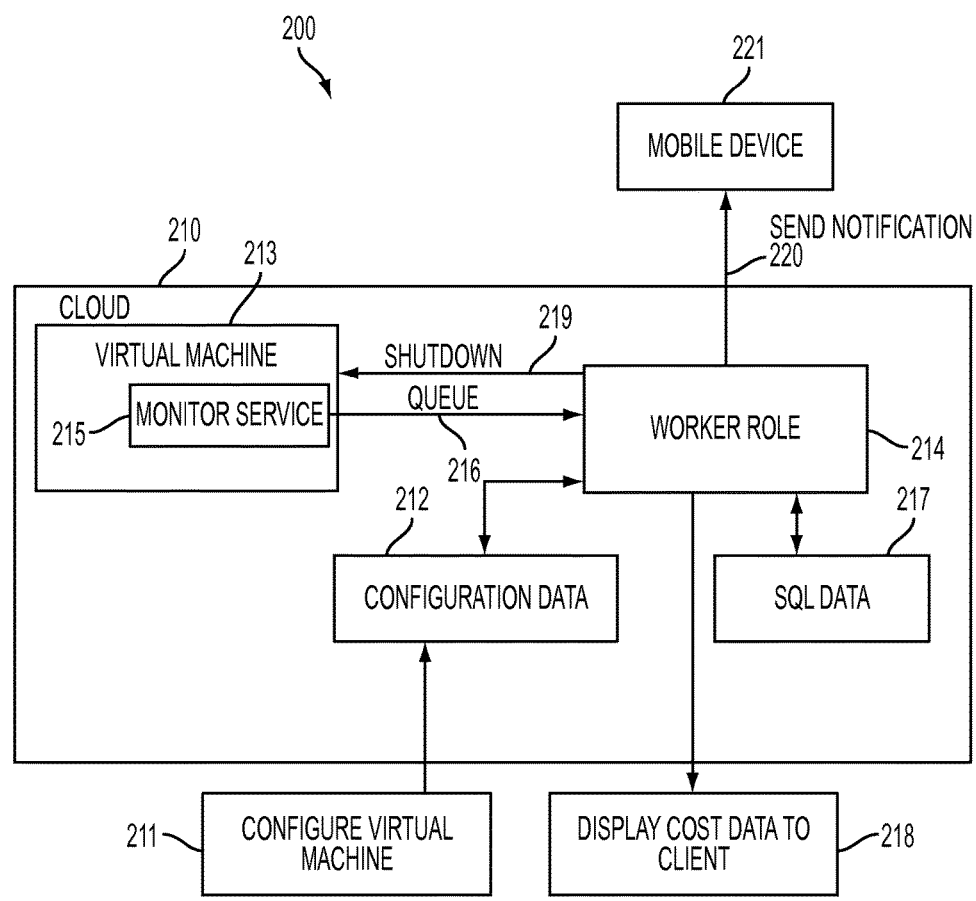
FIG. 2 illustrates an embodiment utilizing [WINDOWS] [AZURE] as an exemplary cloud platform.

FIG. 2 shows an embodiment of a network 200 utilizing [WINDOWS] [AZURE] as an exemplary cloud platform.

In the network 200 utilizing [WINDOWS] [AZURE] as an exemplary cloud platform 210, an input device, such as a user interface, webpage, or mobile device, is used to configure an operating limit 211, such as an inactive runtime limit or cost limit for the virtual machines 213, as configuration data 212. This configuration data 212 may be stored for access by an worker role 214.

The virtual machines 213 have a service 215 installed that may monitor and report the virtual machine's status and operating information. The service 215 installed on the virtual machine 213 may monitor information including the virtual machine's size, inactivity timer, active runtime, and the virtual machine's starts and stops.

The service 215 will send the virtual machine information to an worker role 214 via the queue 216. The worker role 214 will monitor the queue 216 for data updates. Once a data update is received, the worker role 214 will then begin to process the virtual machine data.

The worker role 214 will then process the data updates from the queue 216 by recording the virtual machine information. The information data may include the virtual machine size, running state, inactivity timer, and length current runtime. This information will be recorded in a database, which may be a SQL database 217. Once the data was been recorded, the current cost calculation for the virtual machine will be performed.

The configuration data 212 configured through the input device will then be retrieved for the virtual machine. The configuration data 212 will then be compared to the current information, such as the current cost data or current inactivity data. Depending on the configuration data, the virtual machine can be automatically shut down 219 if the current data exceeds limits placed in the configuration data 212.

The worker role may also be configured for a notification 220 to be sent to a device 221 to alert a user of a virtual machine's inactivity or that configured costs have been exceeded. The notification 220 can also give a user the option to shut down the virtual machine or keep it running.

In one embodiment, the worker role can generate a cost report 218 for a virtual machine or a group of virtual machines from the stored virtual machine information. The cost report 218 may be formatted such that it can be displayed, such as on a user interface, webpage, or mobile device.

Configuration Data

In one or more of the embodiments, an input device, such as a user interface, webpage, or mobile device, is used to configure an operating limit, such as an inactive runtime limit or cost limit for the virtual machines. This configuration data may be stored for access by an worker role.

In one or more of the embodiments, at least one of numerous different operation condition values can be set by the user for monitoring and comparison by the worker role. Depending on the configuration data and the worker role, the action taken by the worker role if the current data exceeds the limits placed in the configuration data may differ. In one embodiment, the virtual machine can be automatically shut down if the current data exceeds the limits placed in the configuration data. The worker role may also be configured for a notification to be sent to a device to alert a user of a virtual machine's inactivity or that configured costs have been exceeded. The notification can also give a user the option to shut down the virtual machine or keep it running.

Non-limiting examples of the operation conditions that a user may choose for monitoring and comparison or action by the worker role include:

Inactivity Length—This value will determine that amount of time that a virtual machine can be inactive before action needs to be taken. This time value may be in any measurement of time as desired or necessary in the cloud computing platform. In one exemplary embodiment, the inactivity time value is a time measurement of hours.

Maximum Cost—This value will specify the maximum cost a virtual machine can incur before action needs to be taken. This may be a localized monetary value.

Billing Cycle Start—This will be the date a billing cycle for monitoring begins.

Billing Cycle End—This will be the date a billing cycle monitoring ends.

Maximum Cost Time—This value will be the length of time the Max Cost value should apply to. This will be a time span. A non-limiting example is where Maximum Cost is $45 and Maximum Cost Time is 1 Month. In this example, the configuration data specifies that action needs to be taken when the current cost for a one month period exceeds $45. If no value is specified this will default to the billing cycle.

Action—This will specify what action is to be taken such as when Inactivity Length or Maximum Cost values are exceeded. Non-limiting embodiments of action include shut down, notify user, or take no action.

Virtual Machine Service

In one or more embodiments, the service will be used to monitor and report information about a virtual machine. Information reported by this service may include virtual machine size, current run state, and current run time for comparison against the configured data values that the user sets. The service will periodically gather and report this information to an worker role. The period for gathering may be configured and adjusted as desired by the cloud platform or user.

To communicate with the worker role, the service will use the queue. Information gathered by the service will be sent to a worker role via the queue. The worker role will monitor the queue for updates. When an update is found the worker role will then update the SQL data and then check the virtual machines configuration.

After the configuration data has been compared, the worker will determine if any action needs be taken. If any action is required the worker role will then initiate the configured action on a virtual machine.

In one embodiment, the service will also monitor a virtual machine for shut down and startup conditions. When a shut down or start up condition is detected on a virtual machine, the service will gather and send information to the worker role.

Virtual Machine Information Database

In one or more exemplary embodiments, the virtual machine information is stored in a database in the cloud platform.

In one or more exemplary embodiments, SQL is used to store information about each configured virtual machine. The SQL data can exist in an cloud SQL database or in a local on premise SQL database.

Non-limiting examples of the fields for a SQL table layout that a user may choose for storing the virtual machine information include:

ID—This may be an integer used a primary key for the table.
VM Name—This may be a nvarchar unique name used to identify a virtual machine.
VM Size—This may be a nvarchar used to identify the virtual machine size.
VM Runtime—This may be a float to runtime in hours for a virtual machine.
VM Billing Start—This may be a Datetime for the start date of the current virtual machine billing cycle.
VM Billing End—This may be a Datetime for the end date of the current virtual machine billing.
Configured action—This may be a nvarchar used to identify the configured action to be taken when a virtual machines exceeds cost or inactivity limits in current billing cycle.
Inactivity Limit—This may be a float for the total time in hours a virtual machine can be running during the current billing cycle before action is taken.
Cost Limit—This may be a currency for the localized currency limit a virtual machine can incur on the current billing cycle before action is taken.
Daily runtime—This may be a float for the daily runtime measured in hours of a virtual machine.

Worker Role

Figure 3:
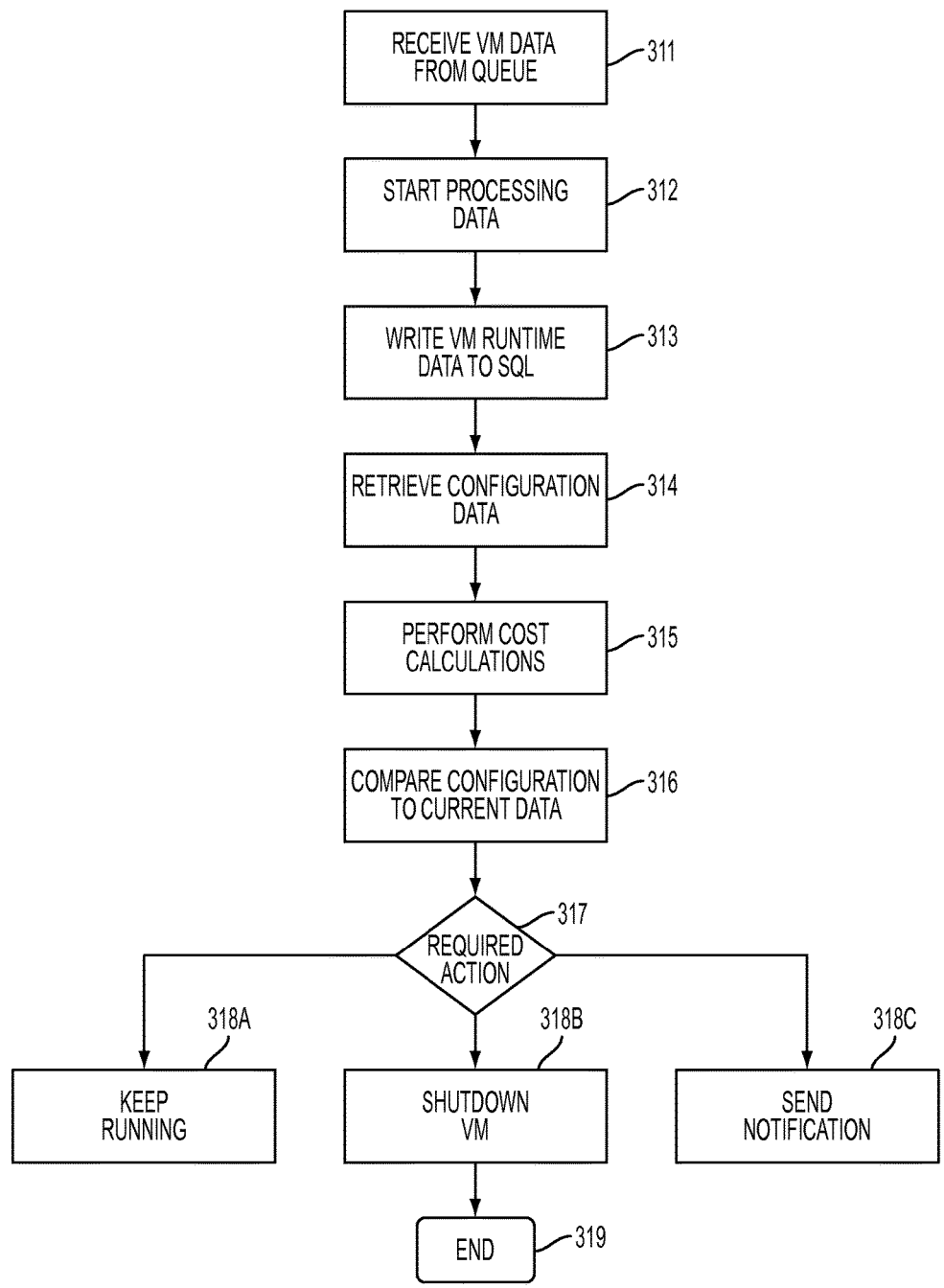
FIG. 3 illustrates a flow diagram for a worker role in an exemplary embodiment.

FIG. 3 shows an exemplary flow diagram for a worker role.

In one embodiment, the worker role receives virtual machine information through the queue 311. The information can then be processed 312 and stored to a database 313. The worker role can retrieve configuration data 314 and perform cost calculations based on the virtual machine information 315. The configuration data can then be compared to the cost calculations and virtual machine information 316 to decide if an action is required by the worker role.

If an action is required by the worker role 317, the worker role can act in at least one including keeping the virtual machine running 318A, shutting down the virtual machine 318B and ending the process 319, and sending an alert or notification 318C.

Cost Calculations

In order to calculate the current cost and cost prediction values, some information from the virtual machine will be required. This information may include the size of the virtual machine, the virtual machine total runtime, and the values from a cloud platform virtual machine cost chart. The virtual machine service component can collect the virtual machine size as well as the virtual machine runtime information. This data as it is collected may be stored in a SQL database by the worker role. In one embodiment, the virtual machine runtime data can be stored as total number of hours run daily. The virtual machine runtime value will only be updated when a virtual machine is in a running state. Additionally, virtual machine cost per hour data may be available from the cloud computing platform and will be stored a SQL table.

Also, the current and predictive virtual machine costs can be calculated for a group of virtual machines. This calculation will be similar to an individual virtual machine cost calculation, but will be broken down by each individual virtual machine and then summed to calculate a total group cost.

Current Cost Calculations

In one embodiment, the current cost data will be calculated for the current monthly billing cycle. The current billing cycles dates and daily runtime data will be retrieved from SQL. The daily runtime data will be summed and then multiplied the cost for the virtual machine size. Periodically, the virtual machine will report its current status and its total runtime since its last report period and this information will be stored in a database. A calculation can then be performed to generate its current cost this billing cycle.

$$\text{TotalHours} = \text{Sum of the runtime for each day in the billing cycle} \quad (1)$$

$$\text{CurrentCost} = \text{TotalHours} * \text{HourlyRate} \quad (2)$$

The HourlyRate is a per hour rate based on the virtual machine size and type. The TotalHours is the total number of hours the virtual machine has run this billing cycle.

The calculations and information may then be displayed or sent to the user depending on what options they specified in the configuration. The current cost (CurrentCost) will be used to determine if any actions need to be performed on this virtual machine. The configured cost limit will be checked in the configuration. If the current cost is greater than the configured cost limit, the virtual machine will take action as configured, such as shutting down the virtual machine or sending an alert.

Predictive Cost Calculations

In one embodiment, the worker role can calculate a predictive or projected cost calculation. In this way, a user can estimate future costs and plan accordingly. In one embodiment, the worker role will use the same values as the current cost calculation. However it will need some information from a user estimating how many hours the user plans to run the virtual machine. Once a user inputs the estimated total hours a virtual machine is to run, the future projected cost can be calculated for each virtual machine specified.

In one embodiment, future Cost Predictions are very similar to the current cost but can have some more factors that are taken into account. In an embodiment, a web page can be used so that a user can ask for predictive costs of a virtual machine or group of virtual machines based off of past run time data. The user will specify the number of months to calculate the costs for. The database will be used to lookup total runtime and the total number of billing cycles for a virtual machine to generate an average monthly runtime.

$$(r/b)*m*c = \text{Future cost}, \quad (3)$$

$$(r/b) = \text{average monthly runtime}, \quad (4)$$

$$r = \text{total runtime}, \quad (5)$$

$$b = \text{number of billing cycles}, \quad (6)$$

$$m = \text{total number of months}, \quad (7)$$

$$c = \text{Per hour rate based on Virtual Machine Size and Type}. \quad (8)$$

If there are multiple virtual machines the future cost of each can be summed to form a total future cost.

In one embodiment, the user can also specify what billing cycles will be used to calculate the average cost. This can act as a simulation to see what costs will be incurred over a time frame.

Configuration of Personal Computers (PCs)

In one embodiment, the service and worker role can be applied to PCs, rather than just virtual machines. This could be done by simply installing the monitor service used by the virtual machine on a PC. The service could then use the cloud infrastructure just as it would with a virtual machine. The Queue will be used to send data to an worker role running in the cloud. The worker role would then process information, write it to SQL, and then take the configured actions as described in embodiments of the disclosure.

According to one embodiment, the disclosure may be applied to PCs by allowing remote configuration of PCs. In one application to PCs, the control method could allow IT groups to remotely configure large groups of computers by leveraging the cloud infrastructure. These PCs could be remotely configured to shut down at a certain time or when inactive for a certain period of time. Non-limiting uses show this could help an organization improve efficiency or security. Exemplary uses include saving electricity costs by shutting down computers and promoting security by locking inactive computers.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Although the drawings describe the control of virtual machines through a specific order, one should not interpret that the control of virtual machines is performed in a specific order as shown in the drawings or successively performed in a continuous order, or all steps are necessary to obtain a desired result. Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

There is claimed:

1. A method for controlling a virtual machine in a cloud environment, with a worker role, based on operating conditions, the method comprising:
    storing a configuration data input for a threshold value of an operating characteristic;
    receiving an operational data regarding a status of the virtual machine;
    storing the operational data regarding the status of the virtual machine;
    calculating an operational cost data from the operational data, the operational cost data including a monetary data value;
    comparing the calculated operational cost data with the threshold value of the operating characteristic; and
    sending a command to shut down the virtual machine where the calculated operational cost data meets or exceeds the threshold value of the operating characteristic.

2. The method of claim 1, further comprising:
    sending an alert to notify a user that the calculated operational cost data meets or exceeds the threshold value of the operating characteristic.

3. The method of claim 1, wherein:
    the operational data regarding the status of the virtual machine is stored in a Structured Query Language (SQL) database.

4. The method of claim 1, wherein the configuration data is input by means of a website or mobile device.

5. The method of claim 1, wherein the threshold value of the operating characteristic further comprises a maximum inactivity time for the virtual machine, and
    wherein the worker role further compares a length of inactivity time of the virtual machine to the maximum inactivity time.

6. The method of claim 1, wherein the threshold value of the operating characteristic is a maximum cost that the virtual machine can incur, and
    wherein the stored operational data regarding the status of the virtual machine includes a current cost of operation.

7. A device network for controlling a virtual machine in a cloud environment based on operating conditions, the device network comprising:
    a virtual machine controllable by the cloud environment;
    an input device configured to allow a user to configure a threshold value of an operating characteristic;
    at least one non-transitory computer readable medium operable to store program code;
    at least one processor operable to read said program code and operate as instructed by the program code, the program code comprising:
        a worker role in the cloud environment configured to:
            retrieve a operational data from the virtual machine;
            calculate an operational cost data from the operational data, the operational cost data including a monetary data value;
            compare the calculated operational cost data and the threshold value of the operating characteristic as configured through the input device; and
            send a command to shut down the virtual machine where the calculated operational cost data meets or exceeds the threshold value of the operating characteristic.

8. The device network of claim 7, wherein the threshold value of the operating characteristic further comprises a maximum inactivity time for the virtual machine, and wherein the worker role further compares a length of inactivity time of the virtual machine to the maximum inactivity time.

9. The device network of claim 7, wherein the threshold value of the operating characteristic is a maximum cost that the virtual machine can incur, and
wherein the operational data includes a current cost of operation.

10. The device network of claim 7, wherein the threshold value of the operating characteristic is a maximum predicted cost for the virtual machine, and
wherein the operational cost data includes a predicted cost according to a formula of:

$$(r/b)*m*c=\text{Future cost},$$

wherein:

$(r/b)$=average monthly runtime, $r$=total runtime, $b$=number of billing cycles, $m$=total number of months, $c$=Per hour rate based on Virtual Machine Size and Type.

11. The device network of claim 7, wherein the threshold value of the operating characteristic is a maximum cost for the virtual machine, and
wherein the operational data is retrieved from a Structured Query Language (SQL) database and includes total runtime and hourly rate cost information for the virtual machine.

12. A method for controlling a device in a cloud environment, with a worker role, based on operating conditions, the method comprising:
storing a configuration data input for a threshold value of an operating characteristic;
receiving an operational data regarding a status of the device;
storing the operational data regarding the status of the device;
retrieving the configuration data for the threshold value of the operating characteristic;
calculating an operational cost data from the operational data, the operational cost data including a monetary data value, which indicates a current cost of operation within a billing period;
comparing the calculated operational cost data with the threshold value of the operating characteristic; and
sending a command to shut down the device where the calculated operational cost data meets or exceeds the threshold value of the operating characteristic.

* * * * *